Jan. 19, 1937.  J. E. KENNEDY  2,067,964
FURNACE
Filed Nov. 22, 1934  2 Sheets-Sheet 1
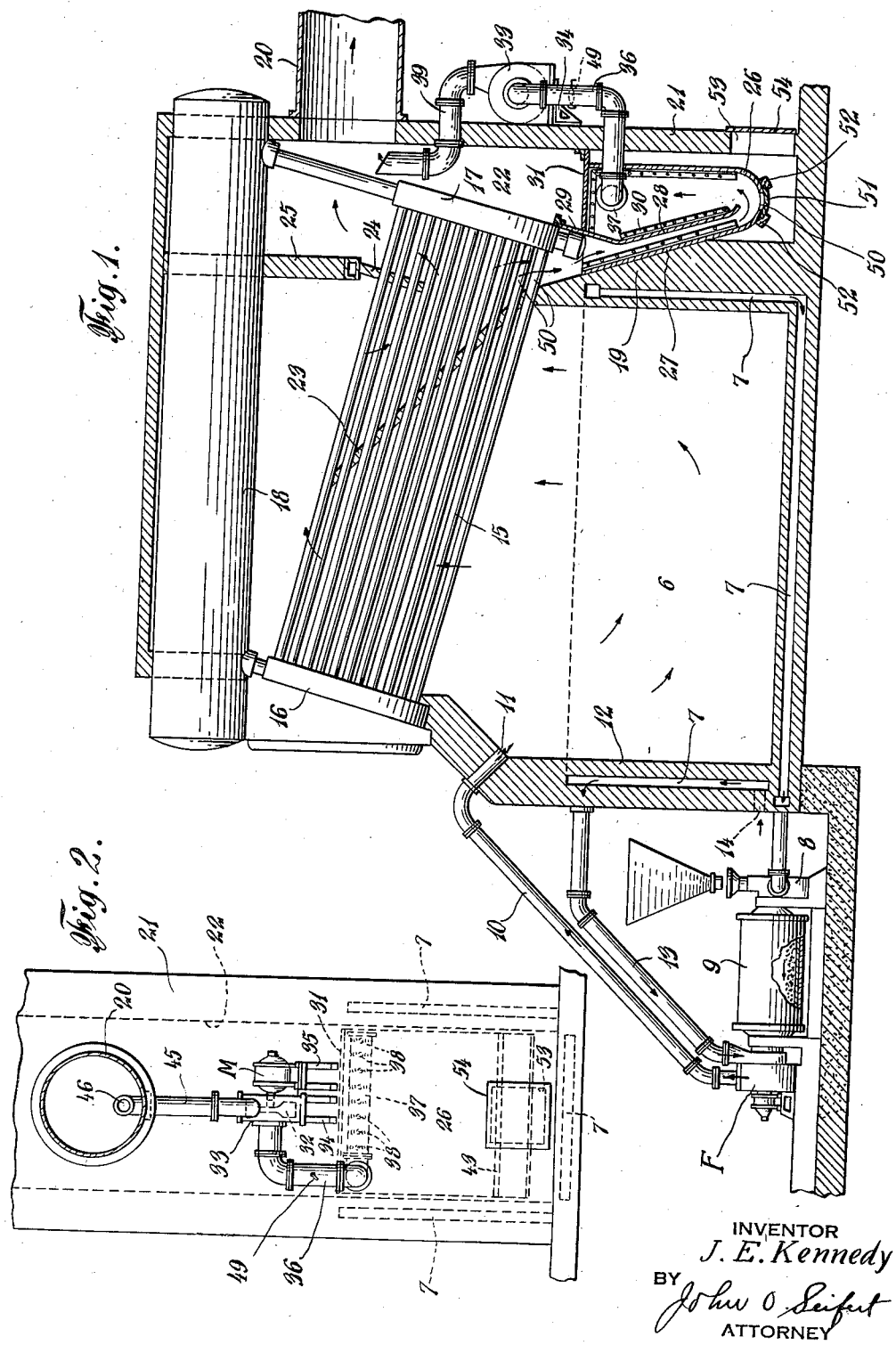
INVENTOR
J. E. Kennedy
BY John O. Seifert
ATTORNEY Jan. 19, 1937. J. E. KENNEDY 2,067,964
FURNACE
Filed Nov. 22, 1934 2 Sheets-Sheet 2
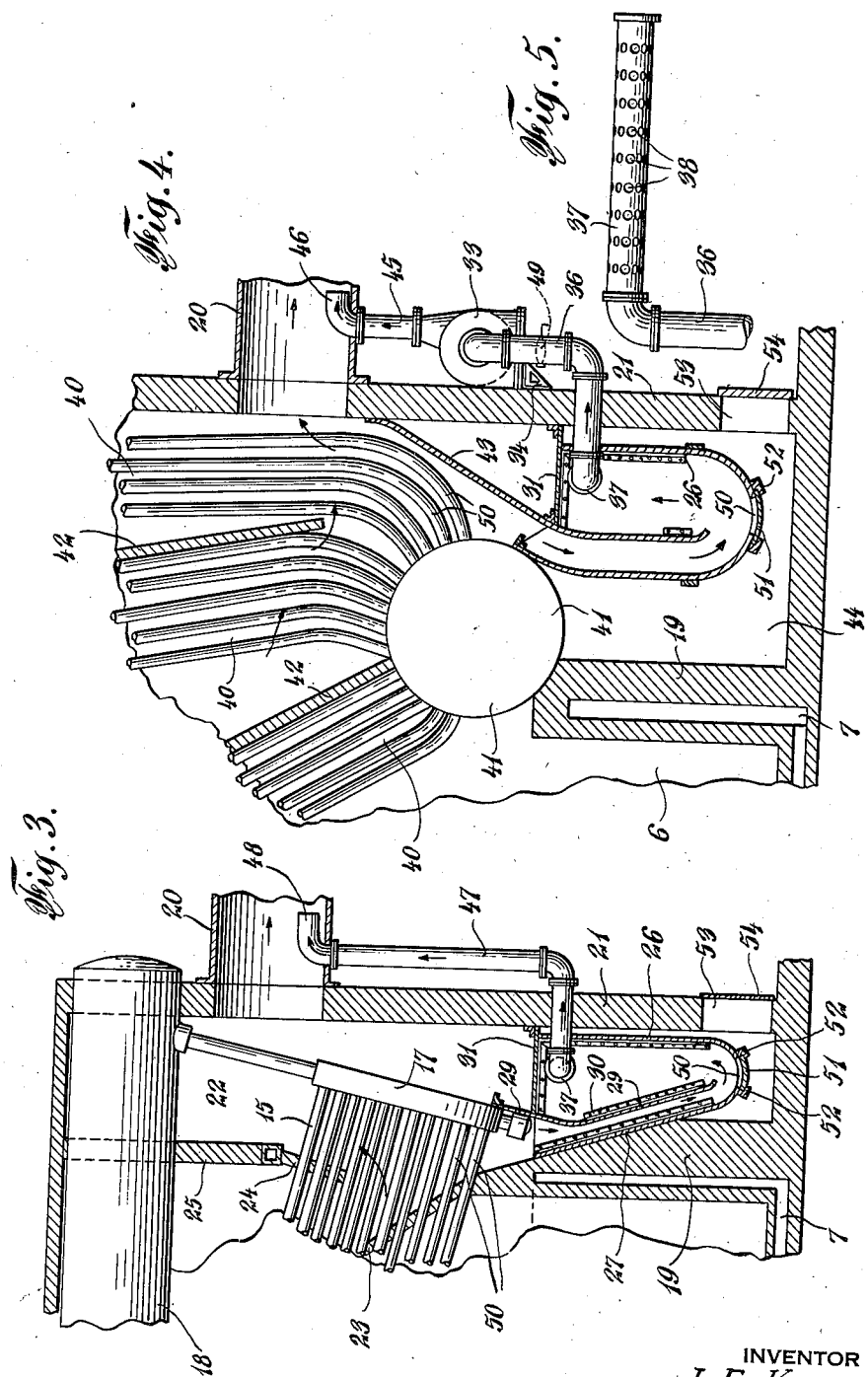
INVENTOR
J. E. Kennedy
BY John C. Seifert
ATTORNEY Patented Jan. 19, 1937

2,067,964

UNITED STATES PATENT OFFICE 2,067,964

FURNACE

Joseph E. Kennedy, New York, N. Y., assignor, by mesne assignments, to Reconstruction Finance Corporation, Philadelphia, Pa., a corporation of the United States Application November 22, 1934, Serial No. 754,253

10 Claims. (Cl. 122—265)

This invention relates to furnaces for boilers, particularly of the water tube type, having an opening or openings in a wall of the furnace through which to fire the furnace and a flue for the outlet of the products of combustion at a point remote from said opening or openings to induce a flow of the heated gases of combustion, means being provided to cause said gases to travel in a circuitous path relative to the boiler tubes to the outlet flue, and it is the principal object of the invention to provide means to prevent the heavier particles of the products of combustion, such as fly ash or soot, from entering the flue and passage of the same with the waste products of combustion to and from the stack.

It is another object of the invention to increase the efficiency of the furnace by the provision of means to divert part of the heated gases into another path of travel to impart additional heat to that portion of the boiler tubes which normally are not subjected to the transference of the maximum amount of the heat from the hot gases.

In the drawings accompanying and forming a part of this application Figure 1 is a side elevation of a furnace having the invention embodied therein and indicating the flow of the gases through the separating and collecting pocket induced by a fan.

Figure 2 is a fragmentary view looking at the right of Figure 4.

Figure 3 is a sectional view of the rear portion of the furnace showing a modified means for inducing the flow of the gases through the separating and collecting pocket of the furnace by the stack draft.

Figure 4 is a view similar to Figure 3 but showing the means of Figure 1 for inducing the flow of the heated gases through the separating and collecting pocket adapted to the structure of a vertical water tube type of boiler; and Figure 5 is a side elevation of a perforated pipe mounted in the separating and collecting pocket through which the gases are withdrawn from said pocket and which prevents withdrawal of the waste material in the pocket.

In carrying out the invention ilustrated in the accompanying drawings, there is provided a furnace arranged with a combustion chamber 6 formed by front, rear and side walls and a floor having air passages 7 therein for heating and supplying heated air to the feed end 8 of a tube mill 9 for pulverizing fuel, such as coal, delivered therefrom by a fan F through a conduit 10 to a burner 11 mounted in an opening in the front wall 12 of the furnace. To aid the combustion of the pulverized fuel heated air is supplied to the fuel drawn from the drum by a conduit 13 connected to the connection of the fan with the mill and an air passage 7 in the front wall 12 of the furnace. Atmospheric air is supplied to the air passages 7 in the furnace walls and floor through inlet passages 14 in the front wall 12 of the furnace, Figure 1.

In the type of boiler furnace shown in Figures 1 to 3, the products of combustion and the heated gases resulting from the burning of the pulverized fuel in the combustion chamber 6 rise and circulate between a series of straight water tubes 15 connected and supported at the ends by a pair of headers 16, 17 at the opposite ends of the tubes, 15 header 16 being mounted on the front wall 12 and connected to one end of a steam drum 18 supported by the furnace to extend the entire length thereof. The header 17 is supported by a wall 19, constituting the rear wall of the combustion chamber with the header 17 positioned exteriorly of said wall, and connected to the steam drum 18 at the end opposite to the end connected to the header 16.

The flow of the products of combustion and the heated gases between and around the tubes 15 is induced by the draft of a stack connected by a flue pipe 20 with a smoke outlet arranged in the rear wall 21 of the furnace in spaced relation to the rear wall 19 of the combustion chamber and forming an elongated chamber 22 in which chamber the header 17 is positioned.

To subject the tubes to and effect the maximum transference of heat thereto from the products of combustion and the heated gases, they are induced to circulate between and around said tubes in a circuitous path by a baffle plate 23 inclining from the top of the wall 19 into the combustion chamber to a point intermediate the ends of said chamber and terminating at the uppermost tier of tubes to direct the rising gases toward the portions of the tubes 15 adjacent the header 16, and a baffle plate 24 extending from the lower end of a vertical wall 25 for supporting the steam drum 18 and constituting a wall of the chamber 22, the baffle plate 24 being extended in parallel spaced relation to the header 17 and at an acute angle to the baffle plate 23 and spaced therefrom to divert the passage of the gases below said baffle to the chamber 22.

The arrangement of the baffle plates 23, 24 will direct the flow of the heated gases carrying waste products of combustion in a circuitous path upwardly and over the upper end of the baffle plate 23, and then downwardly along the upper surface of said baffle plate 23 and below the lower end of the baffle plate 24, whereby the heavier gases having the waste products of combustion suspended therein, such as fly ash and soot, will continue to travel in a downward direction and the lighter gases substantially free of fly ash and soot will be caused to rise by the stack draft through the flue pipe 20 and flow into the upper portion of the chamber 22 to enter said flue pipe, as indicated by the arrows.

The heavier gases laden with fly ash and soot in the passage of the gases between the baffle plates will flow in a downward direction and enter a wide mouth entrance to a downwardly extending passage formed by a declining side wall of a receptacle 26, said declining wall being juxtaposed to a corresponding declining portion of the wall 19, as at 27. The opposite wall of the passage is formed by a plate or sheet of material 28 having a bent portion extending in alignment with the header 17, as at 29, to form the wide mouth of the passage, the remaining portion of said wall 28 being supported in parallel spaced relation to the wall 27 by brackets 30 secured to the wall 28 and the opposite side wall of the furnace constituting the ends of the receptacle 26. The receptacle 26 is mounted in the lower portion of the chamber 22 with the bottom thereof of arcuate form and at the outlet of the passage, the top of the receptacle being closed from the chamber 22 by a plate 31, forming an ash collecting pocket or pit.

To separate the fly ash and soot from the gases in the pocket 26, the gases are drawn in an upward direction from the pocket and by the formation of the bottom of the pocket and entering the gases through the downwardly extending passage the gases are expanded within the receptacle thereby effecting a separation of the fly ash and soot from the gases and precipitation of the same to the bottom of the pocket by the weight thereof. In the structure disclosed in Figures 1, 2 and 4 the flow of the gases through the pocket is induced by a fan 32 (Figure 2) rotatably mounted in a casing 33 supported by a bracket 34 fixed to the exterior of the furnace wall 21. The fan 32 is actuated by an electric motor M supported from the wall 21 by a bracket 35. The inlet to the fan casing 33 is connected with the interior of the pocket 26 by a pipe or conduit 36 connected at one end to the inlet of the fan casing and the opposite end portion extended through the furnace wall 21 and the wall of the pocket and connected to one end of a pipe 37 mounted in the upper portion of the pocket, the other end of the pipe 37 being closed and the side wall perforated, as shown at 38 in Figure 5, to serve as a baffle and prevent removal of the fly ash and soot with the flow of the gases from the pocket.

The gases are delivered by the fan 32 to and exhausted through the flue pipe 20. In use with a horizontal water tube type of boiler furnace, as shown in Figure 1, the gases are delivered from the fan casing 33 through a pipe or conduit 39 connected in communication with the outlet of the fan casing and extended through the furnace wall 21 into the chamber 22 with the outlet end thereof terminating in line with the flue opening so that the gases are drawn in to the flue by the stack draft, as illustrated by the arrows.

In Figure 4 the invention is shown applied to a vertical tube type of boiler furnace wherein a plurality of sections of water tubes 40 are mounted in the furnace to extend in substantially vertical planes with the upper ends of the tubes connected to steam drums, not shown, and the lower ends in communication with a mud drum 41 mounted on the wall 19 of the combustion chamber 6 with baffle plates 42 interposed between each section of water tubes to divert the stream of gases from the combustion chamber to the flue pipe in a circuitous path about the water tubes and in a downward direction to adjacent the flue 20, as shown by the arrows. Due to the arrangement of the water tubes adjacent the flue pipe the ash pocket 26 is arranged with the side walls in substantially vertical and parallel relation to each other, the downwardly extending passage being formed by a plate 43 mounted at the ends on the side walls of the furnace and the top closure plate 31 of the pocket to extend obliquely from the inlet to the rear furnace wall adjacent the flue pipe 20 and into the pocket parallel to a side wall of said pocket. The wall 43 will divert the flow of the ash laden gases into the entrance passage to the pocket. The pocket 26 is mounted in a chamber 44 formed by the bridge wall 19, rear furnace wall 21, mud drum 41 and the water tubes 40. The outlet of the fan casing 33 is connected to the flue pipe 20 by a pipe or conduit 45 exteriorly of the furnace having an arcuate outlet end 46 mounted in the flue pipe to extend in the direction of flow of the gases in the flue pipe due to the arrangement of the water tubes 40 adjacent the flue inlet.

In Figure 3 there is illustrated an arrangement whereby the flow of the gases through the ash separating and collecting pocket 26 is induced by the stack draft by a pipe or conduit 47 having an end portion extended through the furnace wall 21 connected to the perforated separating pipe 37, the opposite end arranged with an arcuate discharge outlet portion 48 is mounted in the flue pipe 20 similar to the arrangement of the pipe 45 in Figure 4. Whether the flow of the gases through the ash pocket 26 is induced by a fan or by the stack draft will depend on the strength of the draft in each particular structure of furnace, and the use of the stack draft alone may be used in any type of furnace and not only in a horizontal water tube boiler furnace, as illustrated in Figure 3. The use of the fan 37 to induce the flow of the gases through the ash pocket will also increase the force of the draft in the furnace and to use the fan 37 exclusively for creating a draft in the furnace or to induce and regulate the flow of the gases through the ash pocket 26, a damper is arranged in the pipe 36, as indicated in dotted lines at 49.

In all the arrangements of the ash pocket 26 the ashes are removed through a clean out opening 50 arranged in the arcuate bottom wall of the pocket having a closure 51 slidably mounted on the exterior of the pocket, and the ashes are removed from the furnace through an opening 53 in the furnace wall 21 having a closure 54.

It will also be noted that the flow of the gases laden with the heavy waste products of combustion to the separating and collecting pocket will pass a portion of the water tubes, as at 50, that will not ordinarily be affected by the flow of the gases from the combustion chamber to the outlet flue and whereby there will be a maximum transference of heat to said portion of the tubes from such heated gases and thereby materially increase the efficiency of the furnace.

While I have illustrated one embodiment of my invention, it will be obvious that various modifications may be made in construction and arrangement of parts, and that portions of the invention may be used without others and come within the scope of the invention.

Having thus described my invention, I claim:

1. In a furnace, a combustion chamber, a smoke outlet spaced from the combustion chamber, means to arrange the furnace with a downward and upward sinuous passage for the gases from the combustion chamber to the smoke outlet, a receptacle mounted in the space between the combustion chamber and smoke outlet, a plate mounted in the receptacle to form with a side wall of the receptacle a passage with the inlet opening to a lower portion of the sinuous passage for the gases and the outlet opening to the bottom of the receptacle, and a perforated pipe mounted in the upper portion of the receptacle having an outlet in communication with and adapted to conduct the gases from the receptacle to the smoke outlet, said pipe in conjunction with the receptacle passage effecting a separation of ash and soot from the gases in their passage through the receptacle to said pipe.

2. In a furnace as claimed in claim 1, a fan connected to the outlet of the perforated pipe operative to induce the flow of the gases from the furnace into the receptacle and through the perforated pipe to the smoke outlet.

3. In a water tube boiler furnace having a smoke outlet, a series of water tubes connected with rear and front headers, means in the furnace to cause the gases to pass in an upward and downward sinuous passage between the water tubes from the combustion chamber to the smoke outlet, a receptacle, a plate mounted in the receptacle to form with a side wall of the receptacle a passage leading from the top to the bottom of the receptacle with the inlet in the upper end opening to the sinuous passage for the gases in the furnace below the water tubes and the outlet at the lower end opening to the bottom of the receptacle for the flow of gases therethrough from the furnace and said passage being of less area than the receptacle and the passage of the gases therethrough into the receptacle effecting an expansion and separation of ash and soot from the gases, a conduit leading from the upper portion of the receptacle to the smoke outlet for the passage of gases from the receptacle to the smoke outlet, and a damper in said conduit to regulate the flow of gases therethrough from the receptacle to the smoke outlet.

4. In a furnace having a combustion chamber and a smoke outlet spaced from the combustion chamber, means in the furnace to cause the gases to travel in a sinuous passage from the combustion chamber to the smoke outlet, a casing having a chamber therein, a plate mounted in the receptacle to form with a side wall of the receptacle a passage the inlet of which passage opens through the top of the chamber to the sinuous passage for the gases from the combustion chamber to the smoke outlet and the outlet opening to the bottom of the casing chamber for the flow of gases from the furnace into and through said casing chamber, means communicating with the smoke outlet and casing chamber to induce a flow of gases from the furnace into and through the casing chamber and delivery of said gases to the smoke outlet, the passage of the gases through the casing chamber effecting a separation of ash and soot from the gases therein, and means to control the flow of gases through the casing chamber to the smoke outlet.

5. In a water tube boiler furnace having a smoke outlet, a series of water tubes connected with front and rear headers, means in the furnace to cause the gases to travel in an upward and downward sinuous passage between the water tubes from the combustion chamber to the smoke outlet, a casing having a chamber therein with an inlet in communication with said sinuous passage between the water tubes and smoke outlet for a flow of gases from the furnace into said casing chamber, and said casing chamber arranged with means to separate and precipitate ash and soot from the gases therein, regulatable means to connect the casing chamber with the smoke outlet, and means to induce the flow of the gases into and through the casing chamber to the smoke outlet.

6. In a water tube boiler furnace having front, rear and side walls with smoke outlet means through the upper portion of the rear wall and a wall extended upward from the furnace floor in spaced relation to the rear furnace wall and constituting the rear wall of the combustion chamber of the furnace, water tubes above the combustion chamber extending from the front to the rear furnace walls connected with a front header disposed above the front furnace wall and with a rear header disposed above the space between the rear walls of the furnace and combustion chamber, means to provide a circuitous passage for the gases rising from the combustion chamber over the water tubes to the smoke outlet means, a receptacle between the rear walls of the furnace and combustion chamber having an inlet in the top opening to the furnace, means to connect the top of said receptacle with and induce a flow of gases from the circuitous passage into and through the receptacle from the furnace to the smoke outlet means, and a plate co-operating with the rear water tube header to connect the receptacle inlet with the circuitous passage in the furnace to provide a passage in the receptacle from the inlet to the bottom of the receptacle, the gases passing through said passage into the receptacle expanding in the receptacle and thereby effecting a separation of the ash and soot from the gases flowing into and through the receptacle.

7. In a furnace having a combustion chamber and a stack outlet spaced from the combustion chamber, baffles in the furnace arranged to provide a sinuous passage for the gases from the combustion chamber to the smoke outlet, a receptacle in the space between the combustion chamber and stack outlet arranged with means to provide a passage in the receptacle having an inlet opening through the top of the receptacle to an intermediate portion of the sinuous passage in the furnace and the outlet opening to the bottom of the receptacle, and means to connect the upper portion of the receptacle in communication with the stack outlet and induce a flow of gases from the furnace through the passage into and through the receptacle to the stack outlet and separate heavy particles from the gases and retain the same in the receptacle.

8. In a furnace, a combustion chamber, a smoke outlet spaced from the furnace spaced from the combustion chamber, means arranged to provide a sinuous passage in the furnace for the flow of the gases from the combustion chamber to the smoke outlet, a receptacle at the rear of the combustion chamber, means mounted in the receptacle to form with a wall thereof an elongated passage in the receptacle having the inlet opening to a lower portion of the sinuous passage in the furnace between the combustion chamber and smoke outlet and the outlet of said passage opening to the bottom of the receptacle, and means for connecting and inducing the flow of gases to and through the receptacle to the smoke outlet comprising a pipe connected at one end in communication with the upper portion of the receptacle and the opposite end opening to the smoke outlet.

9. In a furnace, a combustion chamber, a smoke outlet from the furnace spaced from the combustion chamber, means arranged to provide a sinuous passage in the furnace for the outlet of the gases from the combustion chamber to the smoke outlet, a receptacle at the rear of the combustion chamber, means mounted in the receptacle and forming with a wall thereof an elongated passage in the receptacle having the inlet opening to a lower portion of the sinuous passage in the furnace between the combustion chamber and smoke outlet and the outlet of said passage opening to the bottom of the receptacle, and a fan connected in communication with the upper portion of the receptacle and the smoke outlet to induce a flow of gases to and through the receptacle to the smoke outlet.

10. In a furnace, a combustion chamber, a smoke outlet from the furnace spaced from the combustion chamber, means arranged to provide a sinuous passage in the furnace for the flow of the gases from the combustion chamber to the smoke outlet, a receptacle at the rear of the combustion chamber, means mounted in the receptacle to form with the wall thereof an elongated passage in the receptacle having the inlet opening to the lower portion of the sinuous passage in the furnace between the combustion chamber and the smoke outlet and the outlet of said passage opening to the bottom of the receptacle, means for connecting the receptacle with the smoke outlet and induce a flow of gases from the furnace through the passage into and through the receptacle to the smoke outlet, and adjustable means mounted in the means for connecting the receptacle with the smoke outlet to regulate the connection of the receptacle with the smoke outlet and flow of gases through the receptacle.

JOSEPH E. KENNEDY.